(12) United States Patent
Rehan et al.

(10) Patent No.: US 9,444,863 B2
(45) Date of Patent: Sep. 13, 2016

(54) MANAGER FOR DASH MEDIA STREAMING

(71) Applicant: Intel Corporation, Santa Clara, CA (US)

(72) Inventors: Mohamed M. Rehan, Cairo (EG); Rana A. Morsi, Cairo (EG); Yomna Hassan, Cairo (EG)

(73) Assignee: Intel Corporation, Santa Clara, CA (US)

( * ) Notice: Subject to any disclaimer, the term of this patent is extended or adjusted under 35 U.S.C. 154(b) by 197 days.

(21) Appl. No.: 14/140,764

(22) Filed: Dec. 26, 2013

(65) Prior Publication Data

US 2014/0365556 A1 Dec. 11, 2014

Related U.S. Application Data

(60) Provisional application No. 61/831,912, filed on Jun. 6, 2013.

(51) Int. Cl.
*G06F 15/16* (2006.01)
*H04L 29/06* (2006.01)
(Continued)

(52) U.S. Cl.
CPC .............. *H04L 65/60* (2013.01); *H04L 65/601* (2013.01); *H04N 21/23439* (2013.01); *H04N 21/2402* (2013.01); *H04N 21/26258* (2013.01); *H04N 21/4622* (2013.01); *H04N 21/6373* (2013.01);
(Continued)

(58) Field of Classification Search
CPC ............................... H04L 65/60; H04L 65/80
USPC .................................................. 709/203, 206
See application file for complete search history.

(56) References Cited

U.S. PATENT DOCUMENTS

2011/0307581 A1   12/2011   Furbeck et al.
2012/0151009 A1*  6/2012   Bouazizi ............. H04L 41/5067
                                                                    709/219
(Continued)

FOREIGN PATENT DOCUMENTS

KR   1020120079880 A   7/2012
KR   1020130058648 A   6/2013
(Continued)

OTHER PUBLICATIONS

"International Application Serial No. PCT/US2014/041012, International Search Report mailed Oct. 15, 2014", 4 pgs.
(Continued)

*Primary Examiner* — Glenford Madamba
(74) *Attorney, Agent, or Firm* — Schwegman Lundberg & Woessner, P.A.

(57) ABSTRACT

Client devices streaming content adhering to the Dynamic Adaptive Streaming over HTTP (DASH) standard may send Quality of Experience (QoE) information to a DASH manager and request server status updates from the DASH manager. The server status updates may include information regarding one or more content servers including online status information, content availability, load, and content server recommendations. The content server recommendations may be a relative ranking of servers that the DASH manager recommends that the client device select as a source server for desired media content. Based on the server status update information, the client may select a source server. The QoE information sent to the DASH manager may be used by the DASH manager, along with server status information, to generate the relative ranking.

12 Claims, 9 Drawing Sheets

(51) Int. Cl.
    *H04N 21/2343*     (2011.01)
    *H04N 21/24*     (2011.01)
    *H04N 21/262*     (2011.01)
    *H04N 21/462*     (2011.01)
    *H04N 21/6373*     (2011.01)
    *H04N 21/845*     (2011.01)

(52) U.S. Cl.
    CPC ....... *H04N 21/8456* (2013.01); *H04L 65/4084* (2013.01); *H04L 65/607* (2013.01); *H04L 65/80* (2013.01)

(56) References Cited

U.S. PATENT DOCUMENTS

| | | |
|---|---|---|
| 2012/0209952 A1 | 8/2012 | Lotfallah et al. |
| 2013/0117413 A1* | 5/2013 | Kaneko ................ H04N 21/438 709/217 |
| 2013/0124749 A1 | 5/2013 | Thang et al. |

FOREIGN PATENT DOCUMENTS

| | | |
|---|---|---|
| TW | 201220826 A | 5/2012 |
| WO | WO-2014197657 A1 | 12/2014 |

OTHER PUBLICATIONS

"International Application Serial No. PCT/US2014/041012, Written Opinion mailed Oct. 15, 2014", 5 pgs.

"Taiwanese Application Serial No. 103119402, Office Action mailed Mar. 17, 2016", (English Translation of Search Report), 16 pgs.

* cited by examiner

MANAGER FOR DASH MEDIA STREAMING

PRIORITY CLAIM

This application claims the benefit of priority under 35 U.S.C. 119(e) to U.S. Provisional Patent Application Ser. No. 61/831,912, filed on Jun. 6, 2013, which is incorporated herein by reference in its entirety.

TECHNICAL FIELD

Embodiments pertain to media streaming. More particularly, some embodiments relate to a manager for media streaming that works in conjunction with media servers and media clients.

BACKGROUND

The Dynamic Adaptive Streaming over HTTP (DASH) standard (also known as MPEG-DASH) is a state of the art adaptive video streaming standard. It enables high quality streaming of media content over the internet delivered from conventional HTTP web servers. The standard breaks the content into a sequence of small HTTP-based file segments, with each segment containing a short interval of media. These short segments may be requested and played back in sequence to yield a playback time of several hours.

In the DASH standard, the client selects which segments it wants from the servers it wants to use. The servers return the requested segments and the client device plays the segments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various modifications to the embodiments will be readily apparent to those skilled in the art, and the generic principles defined herein may be applied to other embodiments and applications without departing from the scope of the disclosure. Moreover, in the following description, numerous details are set forth for the purpose of explanation. However, one of ordinary skill in the art will realize that embodiments disclosed herein may be practiced without the use of these specific details. In other instances, well-known structures and processes are not shown in block diagram form in order not to obscure the description of the embodiments of disclosed herein with unnecessary detail. Thus, the present disclosure is not intended to be limited to the embodiments shown, but is to be accorded the widest scope consistent with the principles and features disclosed herein.

Figure 1:
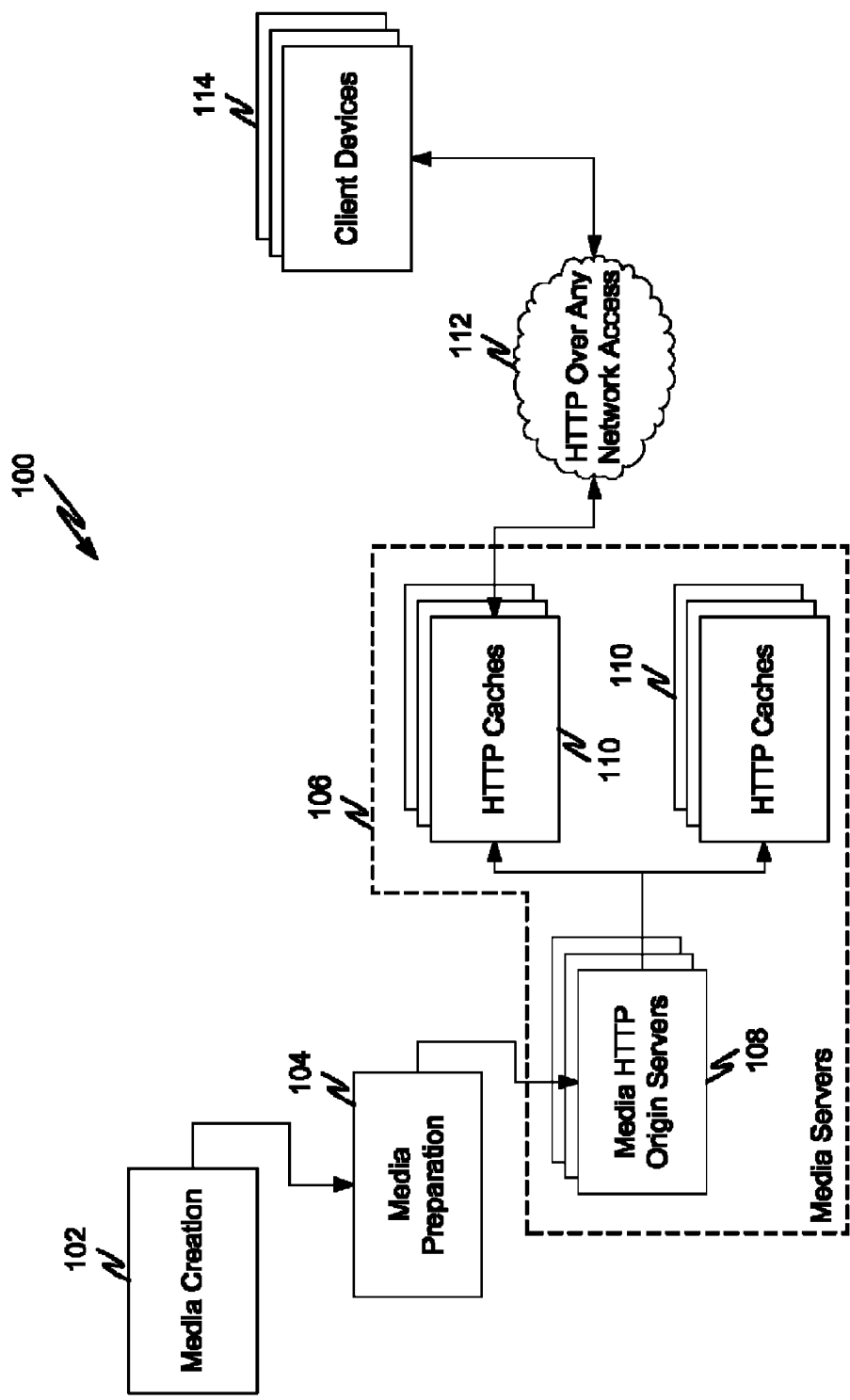
FIG. 1 illustrates an example DASH media streaming network.

FIG. 1 illustrates an example DASH media streaming network 100. The network 100 also illustrates the process of preparing media to be streamed, although such functions may not be part of a media streaming network, strictly speaking.

Network 100 may comprise a media creation system 102. This system represents basically any media source that will ultimately be streamed over the network. The media is next prepared and placed in the proper format for streaming using the DASH standard. This is illustrated by the media preparation system 104. A representative file structure is illustrated in FIG. 2 below.

Once the media is properly prepared, it is hosted on the media servers 106. The media servers 106 may be any type of system where the media content is hosted and/or served. As explained above, DASH uses HTTP to stream the content. The media servers 106 may comprise a hierarchy of origin media servers 108 and HTTP caches 110. In order to make streaming more effective and reduce the load on a single server, multiple copies of media may be located on different servers and then cached at servers that are in some fashion located in geographic or logical proximity to a client so that media may be streamed with fewer delays. Client devices 114 desiring to stream content may make an HTTP request over any network connection 112. The server 106 then returns the requested content.

For the purposes of this disclosure, the complexities of origin servers, caching servers, and so forth can be largely or completely ignored. The model where a client device 114 requests media content via a server 106 Uniform Resource Locator (URL) and the server 106 returns the requested content is sufficient detail.

Figure 2:
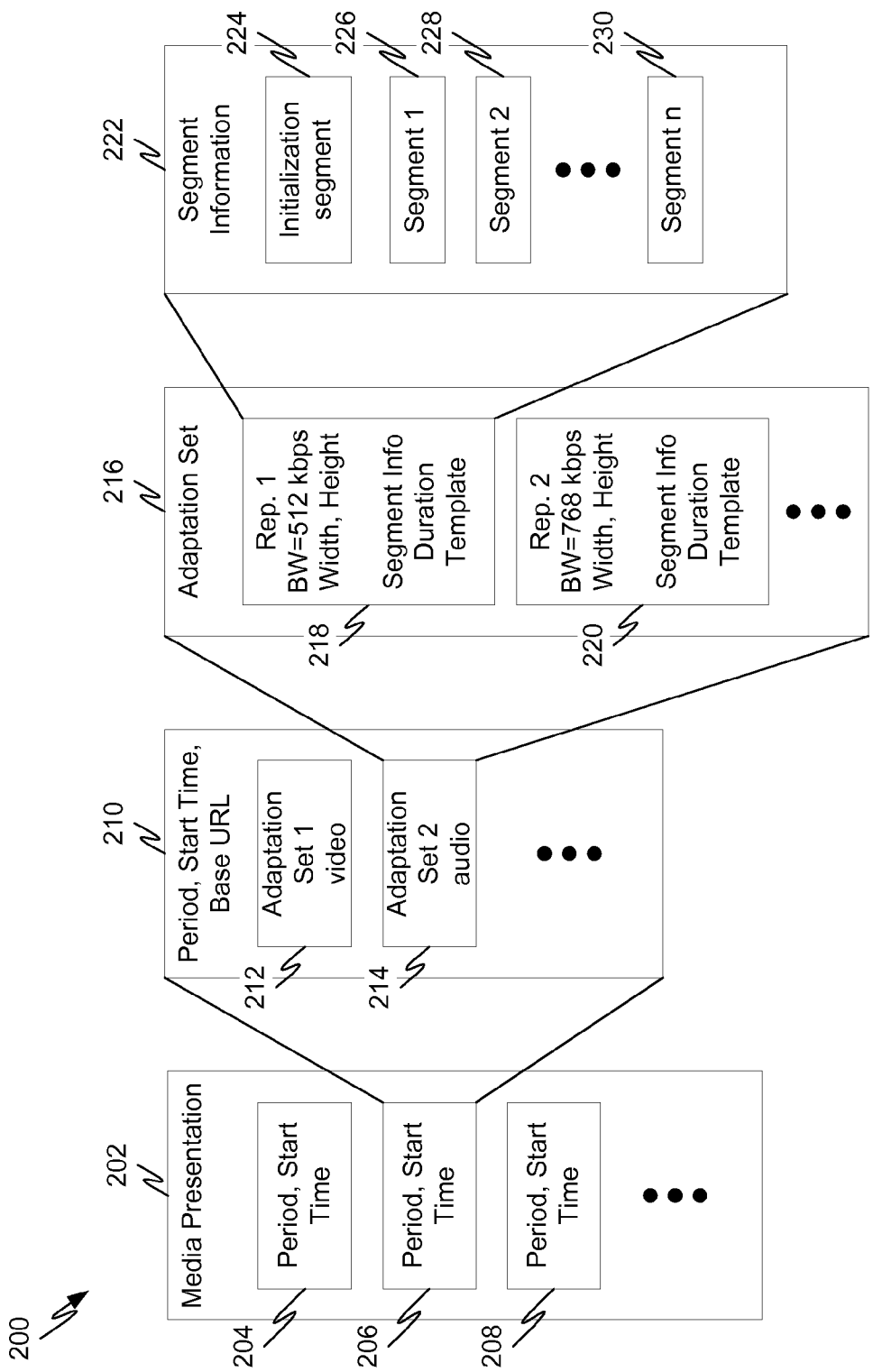
FIG. 2 illustrates an example DASH media file structure.

FIG. 2 illustrates an example DASH media file structure 200. The media presentation file 202, sometimes referred to as a Media Presentation Descriptor (MPD) file, comprises a plurality of period segments 204, 206, 208. In this disclosure, these terms (media presentation file and MPD file) will be used interchangeably and no difference is intended by selecting one or the other. The segmented structure allows the splicing of arbitrary content into the file by adding additional period segments at any location in the file.

A period segment 210 comprises a plurality of adaptation sets 212, 214. Each period segment 210 also comprises the period, the start time, and a base URL where the adaptation sets 212, 214 may be retrieved. The adaptation sets 212 214 may comprise different types of media. In FIG. 2, adaptation set 212 comprises video and adaptation set 214 comprises audio. The various adaptation sets allow the client device to select the components/tracks it desires.

An adaptation set 218 may comprise a plurality of representations 218, 220. Each representation comprises information about the representation such as the streaming bandwidth, the width and height of the representation, and so forth. Thus, in FIG. 2, representation 218 has a bandwidth of 512 kbps, and a designated height and width. The adaptation set also comprises segment information, such as the duration of the segment and a template for the segment. The different representations allow the client device to select and/or switch desired streaming bandwidths at segment boundaries.

The segment 222 may comprise information where the actual segments may be retrieved. Thus, the segment 222 may comprise an initialization segment 224, which includes a URL where the initialization segment may be retrieved, and a plurality of media segments 226, 228, 230. Each media segment may comprises a start time and a URL where the media segment may be retrieved. As indicated above, the media presentation file does not contain the media itself, but does contain information that allows a client device to identify what media is available, the details of the media, and where to receive the media. The segments allow decisions to be made that adapt the retrieved media to various conditions such as fluctuating bandwidth and loads.

Figure 3:
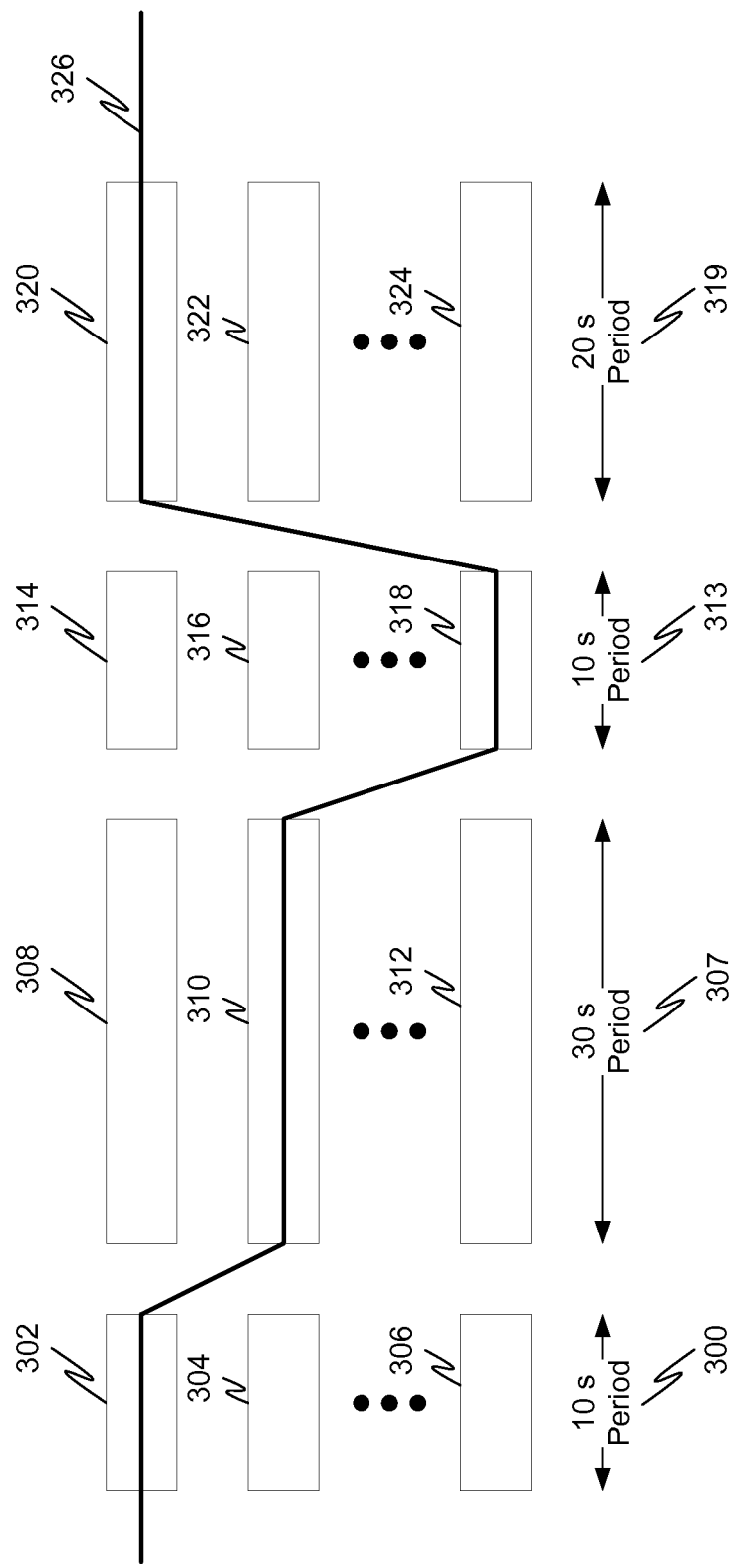
FIG. 3 illustrates an example of a DASH client selecting various media segments.

During the streaming process, a client device is allowed to request a segment from different representations (and from different servers). FIG. 3 illustrates an example of a DASH client selecting various media segments from different representations. In FIG. 3, there are four illustrated periods, 300, 307, 313, and 319. The periods have different lengths. Thus period 300 is 10 seconds, period 207 is 30 seconds, period 313 is 10 seconds and period 219 is 20 seconds.

As indicated in the file structure of FIG. 2, each period has different representations, 302, 304 306 for period 310, 308, 310, 312 for period 207, 314, 316, 318 for period 313 and 320, 322 and 324 for period 319. Each of these representations may be of different bandwidths, sizes, located on different servers, and so forth. A client device may select different representations during the streaming process to adapt to various conditions. The solid line 326 represents an example client device selecting different representations during different periods of the playback.

Figure 4:
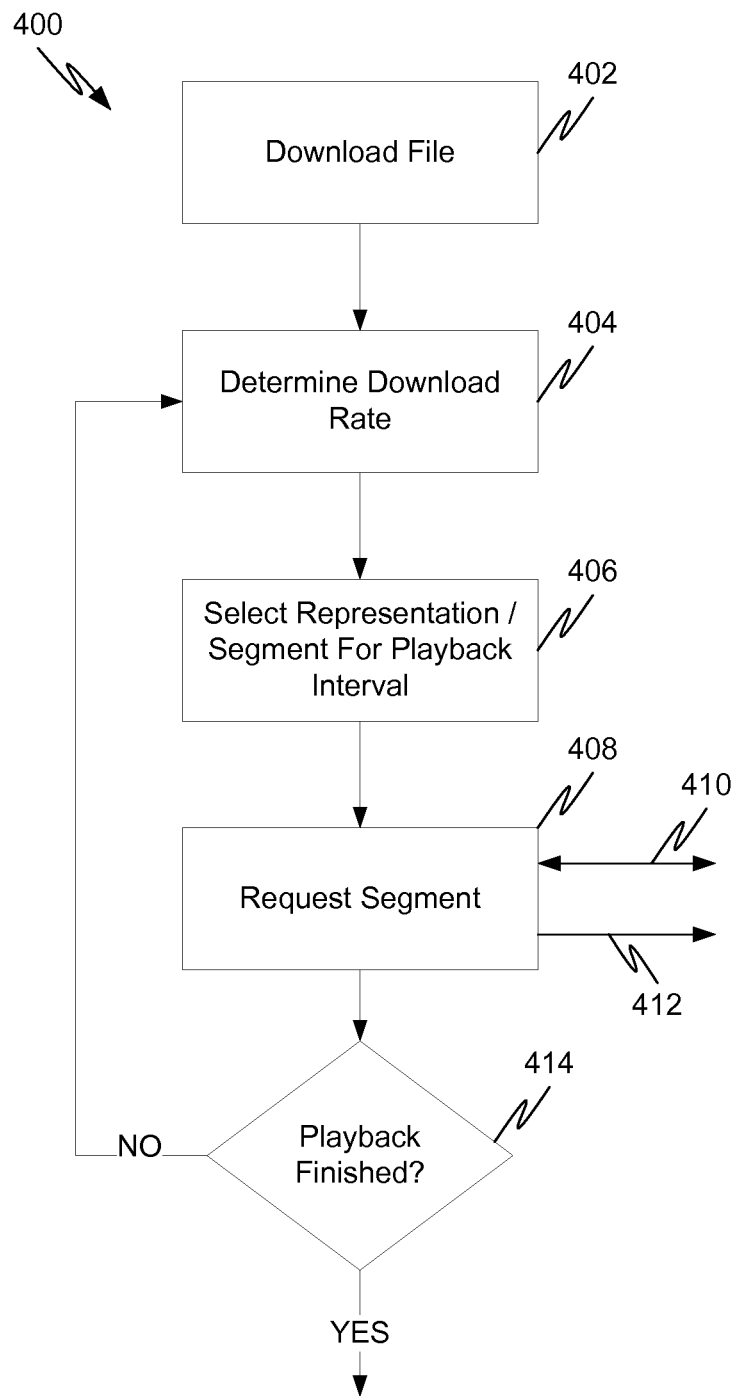
FIG. 4 illustrates an example DASH client device flow diagram.

FIG. 4 illustrates an example DASH client flow diagram 400. The flow diagram begins at operation 402 where the client downloads the media presentation file, which contains the URL, representation and segment details as previously described. In operation 404, the client computes the available download rate and determines which download rate is best for the client for this given segment. In operation 406, the client selects the desired representation/segment for the desired playback time interval(s). In operation 408 the desired representations are requested and received (arrow 410). The incoming representations are handed over to a playback module or other module where they will be handled (arrow 412). Finally in operation 414, these steps are repeated until playback is finished.

Figure 5:
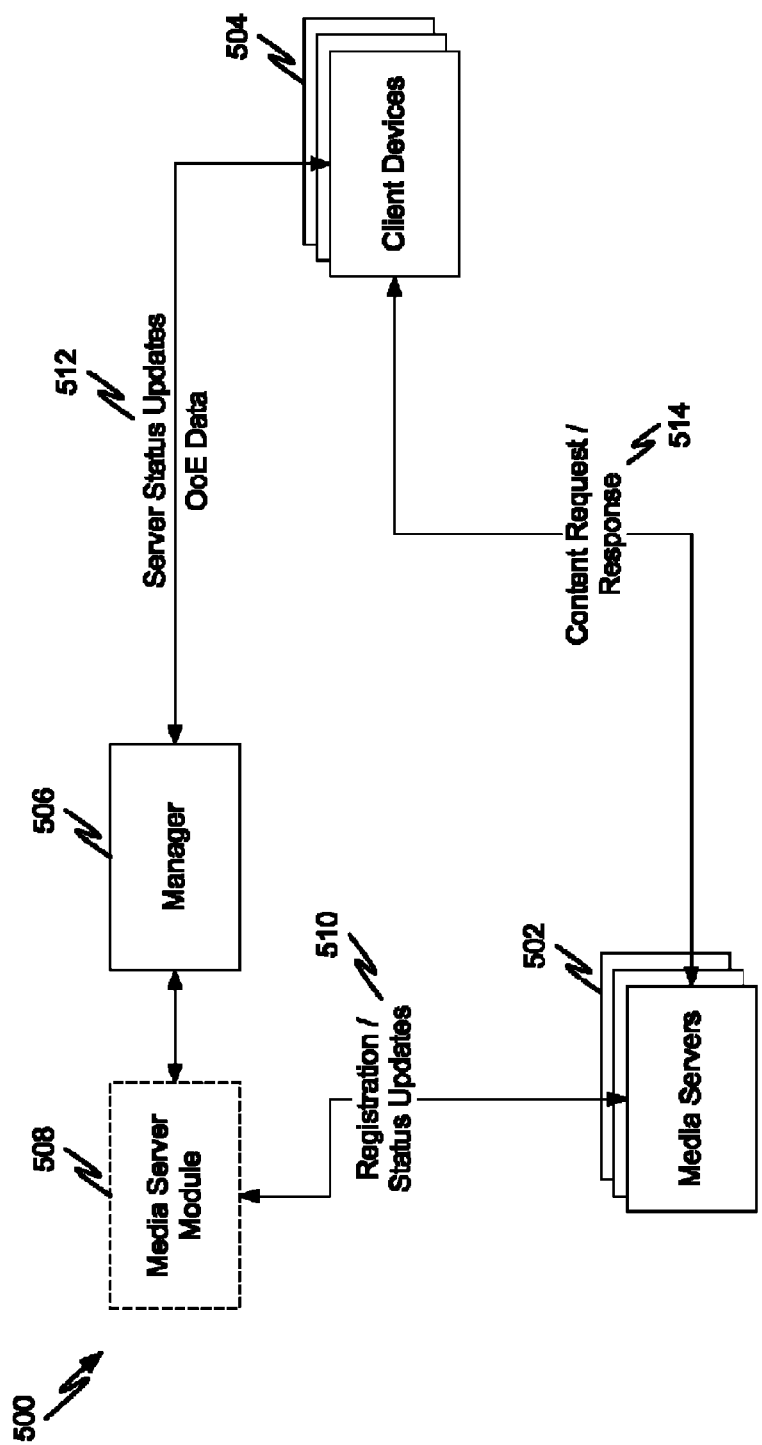
FIG. 5 illustrates an example DASH media streaming network including a manager.

The client device lacks information about media server conditions and, as such, may make suboptimal selections during playback. FIG. 5 illustrates an example DASH media streaming network 500 including a manager 506. The manager 506 may also be called a DASH manager, indicating that it supplements the DASH streaming architecture with additional functionality to help improve the quality of decisions made by a client device when selecting representations during playback.

The media servers 502 may register with the manager 506 to inform the manager of their existence. Communication between the media servers 502 and the manager 506 may be accomplished through an optional media server module 508, which may facilitate the communications in order to minimize the impact of communication between the media servers 502 and the manager 506. Additionally, communication details between different servers may be standardized through the media server module 508 in order to provide a uniform interface that is independent of the many different types and varieties of media servers 502 where content may reside.

Registration of a media server 502 with a manger 506 allows the manager to track the status of the media servers and to know the individual members of the group of media servers for which it has responsibility. Thus, as illustrated by 510, a media server 502 may send status updates to the manager 506 which will then maintain the status information. Status information forwarded from the media server 502 may include online status (e.g., whether a server is online or offline), available content (e.g., what content a media server has to offer), the number of stream clients being served by the media server, the load on the media server, location information, and so forth. The load on the media server may be calculated as the sum of all the upload and/or download rates on the server for all the clients they are servicing in some embodiments. Some embodiments may use the remaining capacity of a media server in place of, or in addition to, the load. The status information allows the manager to identify relative desirability of the media servers should a particular client desire to retrieve content from one of the registered media servers. Thus any information that helps the manager 506 determine the relative desirability of using a particular media server 502 may be included as part of the status information.

Presentation media files hosted by the registered media servers 502 may be updated to include a DASH manager URL so that client devices will know which manager has responsibility for the group of media servers related to a particular presentation media file. The DASH manager URL may take the form shown below.

<DASH_manager>http://{DASH_MANAGER_IP}</DASH_manager>

Where {DASH_MANAGER_IP} is the URL for the DASH manger. The update to the presentation media files may occur when the media server registers with a manager and may be updated as needed if the manager or manager URL changes. The update may be performed by the manager, by the media server, or by another entity.

When a client device 504 requests a presentation media file from a media server 502, the client device 504 may obtain the manager URL from the presentation media file. Before making its selection as to which media server it should use, it can request a server status update from the manager 506 as illustrated by 512. The manager 506 may then return the sever status to the client device 504 as illustrated by 512. The server status sent to the client device 504 may include a relative ranking of the media servers 502 as a recommendation to the client device 504 on which media server 502 it should select for future requests. A recommendation may come in the form of at least one recommended media server. If more than one media server is included in the ranking, then the ranking for each server may be relative to other servers. The server status update 512 may also include other information for the servers (or for a subset of the servers managed by the manger 506) such as online status, content available, load, and so forth. The load on the media server may be calculated as the sum of all the upload and/or download rates on the server for all the clients they are servicing in some embodiments. Some embodiments may use the remaining capacity of a media server in place of, or in addition to, the load. Any of the status information from the media servers 502 may be forwarded to the client device 504 if desired. In some embodiments, the manager 506 may not forward a relative ranking but may forward information in the server status update 512 that may allow the client device 504 to determine a relative ranking and select a desired media server 502.

The client device 504 may also forward Quality of Experience (QoE) information to the manger 506 so that such QoE information may be taken into account when the manager 506 creates the relative ranking for the media servers 502 for the client device 504. The QoE information allows the ranking to take into account the actual experience of the client device in receiving information from a selected media server and/or the actual experience of the client device in receiving information in the aggregate (e.g., from a combination of media servers). The QoE information may include such information as download rate, average download rate, number of buffering events, total buffering time, streaming quality, average streaming quality, failed connections, server(s) selected (e.g., which serves any or all of the information relates to), location, if the ranking takes into account geographic or logical proximity, and so forth. These may be sent in a single aggregate message or in various messages tailored to specific purposes with one or more of the representative information included. Thus, the manager 506 may use feedback from both the client device 504 and from the media servers 502 to make recommendations for load balancing and other objectives. In this way, the server switching may be more specifically tailored to the client's and the server's conditions. Also, this type of server recommendation and switching may be more compliant with the DASH standard since adaptation and rerouting are taken by the client with the manager only providing recommendations.

The manger 506 may be implemented as (or on) a separate system or as part of a media server 502. Additionally, or alternatively, the manager 506 may be implemented as part of an appliance type device such as a router, switch, or other type of device. The same holds true for media server module 508, which may be part of a media server 502, part of a manager 506, or split between them.

Figure 6:
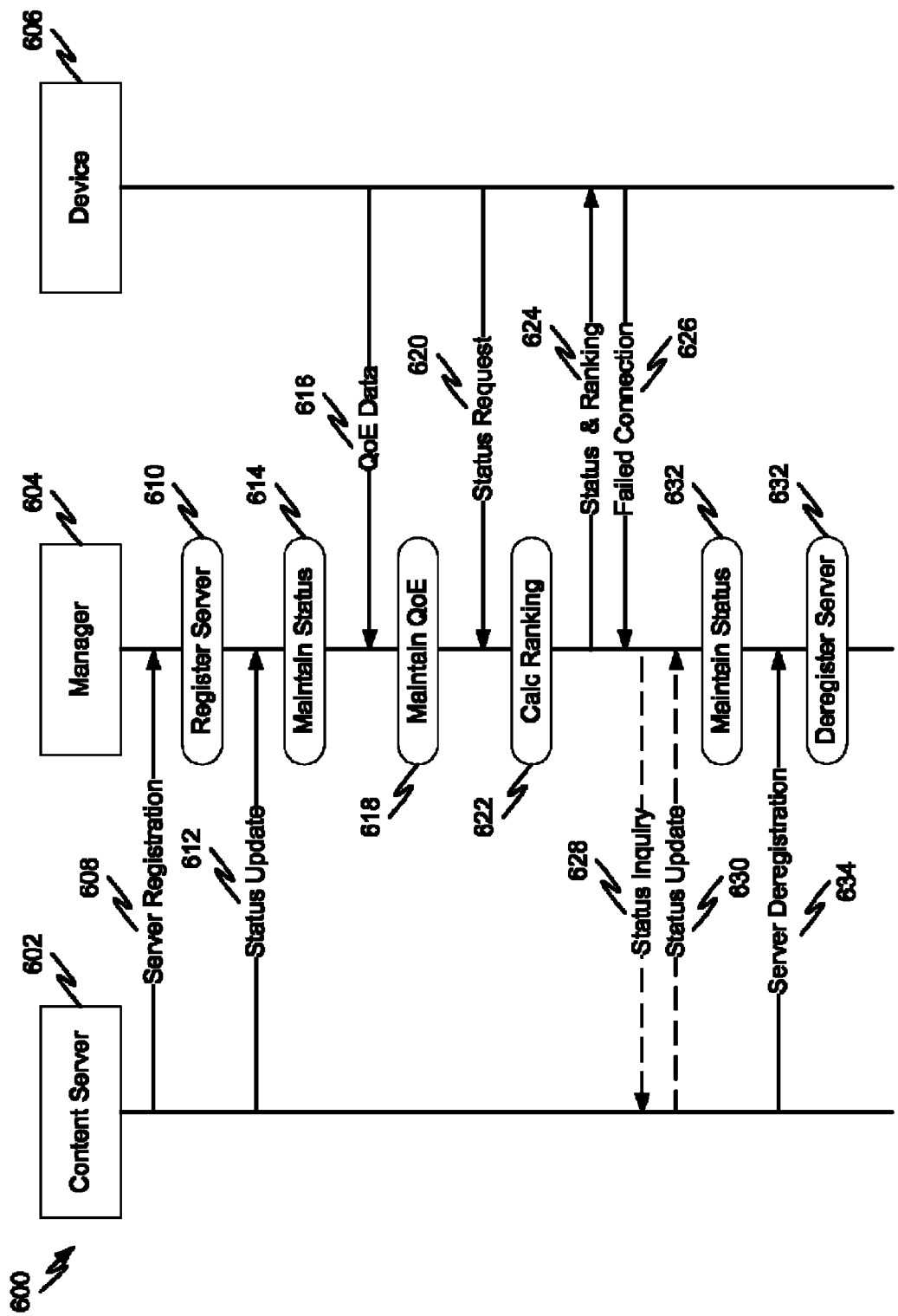
FIG. 6 illustrates an example diagram of the interactions between the client devices, the manager and the content server(s).

FIG. 6 illustrates an example diagram 600 of the interactions between the client devices 606, the manager 604, and the content server(s) 602 according to one embodiment. This embodiment is designed to illustrate some of the message exchanges that may take place between the client devices, 606, the manager 604, and the content server 602. The embodiment does not specifically show the media streaming requests/responses between the client device 606 and the media server(s) 602. The embodiment, rather, focuses on the exchanges with the manager 604.

As indicated in FIG. 6, content server(s) 602 may register with the manager 604 by sending a server registration message 608. The server registration message may indicate to the manager 604 that a server 602 is available and can provide certain content. As new servers come online, they can be dynamically added to a manger's area of responsibility in this fashion. In response, the manager 604 may store the received information in a data store or other location as indicated by operation 610. In this way, the manager 604 knows the collection of servers 602 that it is responsible for tracking and providing information on.

The content servers 602 may provide status update information to the manager 604 as indicated by status update message 612. Status update message 612 may be sent according to some prearranged schedule, due to changes in the data since the last update, in response to an inquiry from the manger 604, or upon any other triggering event. As status information is received, the manager 604 may maintain the status information in a data store or other location as indicated by operation 614. In this way, the most current status of the managed content servers 602 may be known.

The status information may include online status (e.g., whether a server is online or offline), available content (e.g., what content a media server has to offer), the number of stream clients being served by the media server, the load on the media server, location information, and so forth. The load on the media server may be calculated as the sum of all the upload and/or download rates on the server for all the clients they are servicing in some embodiments. Some embodiments may use the remaining capacity of a media server in place of, or in addition to, the load. The status information allows the manager to identify relative desirability of the media servers should a particular client desire to retrieve content from one of the registered media servers. Thus any information that helps the manager 604 determine the relative desirability of using a particular media server 602 may be included as part of the status information.

A client device 606 may send QoE data to the manager 604 as indicated by QoE message 616. The QoE data may include such information as download rate, average download rate, number of buffering events, total buffering time, streaming quality, average streaming quality, failed connections, server(s) selected (e.g., which serves any or all of the information relates to), location, if the ranking takes into account geographic or logical proximity, the particular content the client device desires, and so forth. These may be sent in a single aggregate message or in various messages tailored to specific purposes with one or more of the representative information included. The QoE information may be sent according to some prearranged schedule, due to changes in the QoE information since the last update, in response to an inquiry from the manger 604, or upon any other triggering event. The received information may be stored in a data store or other location as indicated by operation 618. In this way, the manager 604 may maintain QoE information from the client device 606.

When the client device 606 desires to know the status of the content servers 602 and/or receive a suggested ranking on which content server 602 will best meet the client device's 606 needs, the client device 606 may request a server status update as indicated by status request 620. A recommendation from the manager may come in the form of at least one recommended media server. If more than one media server is included in the ranking, then the ranking for each server may be relative to other servers. Some embodiments may include at least some QoE information in the status request.

Because the manager 604 maintains the content server status (operation 614) and the client device QoE information (operation 618), it may take such information into account when calculating a relative ranking of the content servers 602 in order to recommend which content server 602 the client device 606 should select. Thus, the manager 604 may take into account both the content server 602 and the client device 606 feedback when making such recommendations. The relative ranking calculation is illustrated in operation 622. The ranking and/or content server status information may be returned to the client device 606 as illustrated in ranking/status message 624. The status information, if any, returned to the client device 606 may include any or all of the status information maintained by the manager 604 such as, for example, in operation 614.

The client device 606 may also report failed connections to the manager 604. As explained above, such information may be included in the QoE data sent by the device 606 to the manager 604. However, it may be useful in some embodiments to report failed connections immediately rather than wait for QoE information to be sent to the manager 604. This type of situation is illustrated by failed connection message 626.

In some embodiments, the manager 604 may initiate contact with a content server 602 to retrieve status as desired. This is illustrated by status inquiry 628 and status update 630. Similar inquiries may be used to retrieve QoE data from client devices 606 if desired. Any time status information is received, the status information maintained by the manager 604 may be updated as indicated by operation 632.

In order to remove a server from a manger's area of responsibility, a content server 602 (or other entity) may send a server deregistration message 634 to the manger 604. In response, the manager 604 will deregister the server 602 as indicated by operation 632.

Figure 7:
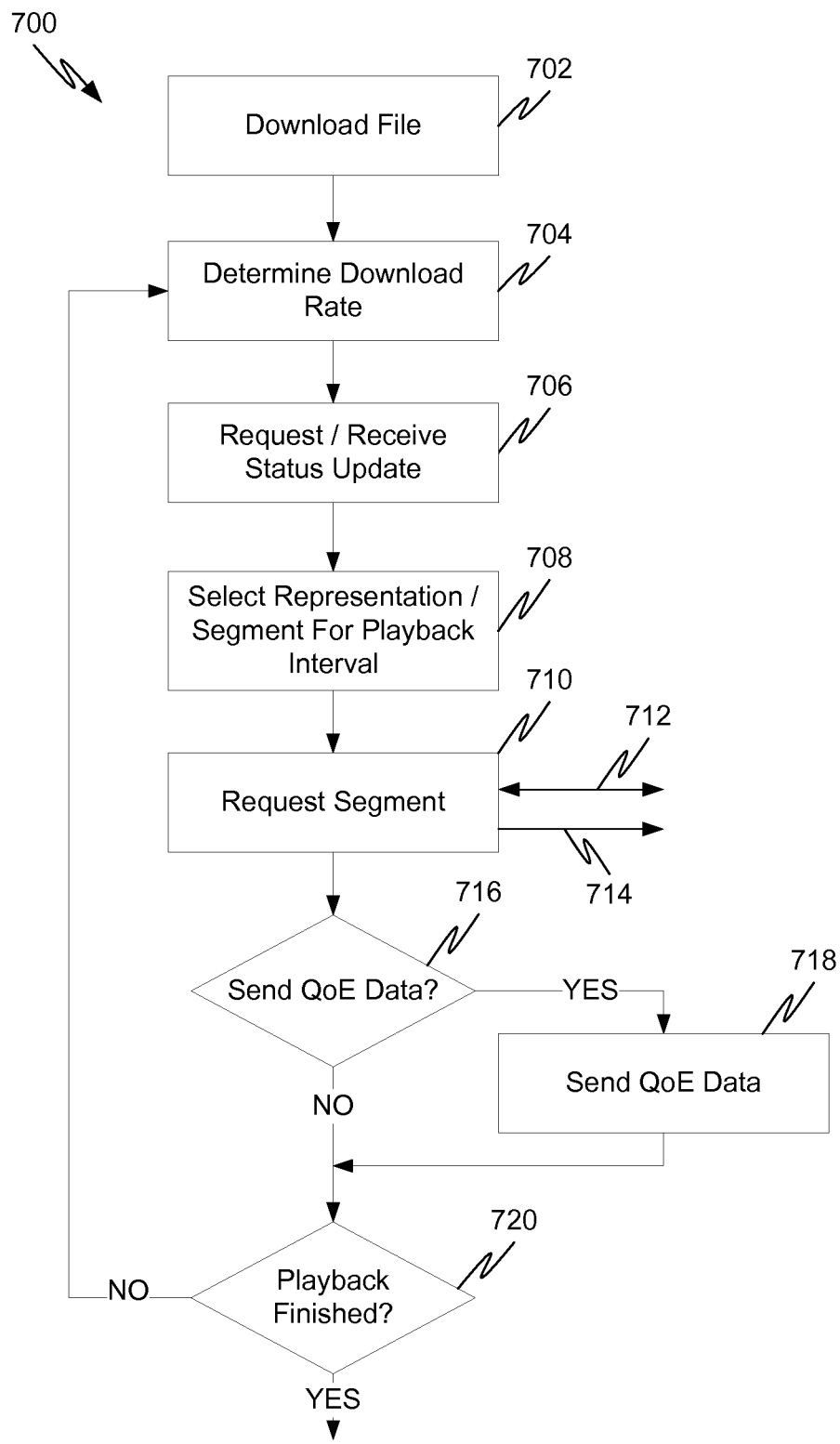
FIG. 7 illustrates an example DASH client device flow diagram.

FIG. 7 illustrates an example client device flow diagram 700. The client device may retrieve a desired media presentation file from a content server as indicated in operation 702. The client device may then determine its desired download rate and other relevant information such as video resolution and so forth, for the media it wants as illustrated in operation 704.

Using the DASH manager URL in the presentation file, the client device may contact the manager to obtain a recommendation of which media server may best suit its needs. This recommendation may include, for example, a relative ranking of all the servers from the manager. Additionally, or alternatively, the client device may request server status information as discussed previously. The process of making these requests and receiving responses is illustrated by operation 706.

Based on the relative ranking, the server status information, the desired content, the desired content parameters (e.g., video resolution, streaming bandwidth, etc. determined in operation 704), the client device may select the segments and representations, along with which server to request them from, for a given playback interval or playback intervals. Operation 706 illustrates the process of selecting the segments/representations.

The process of selecting the content may take on a variety of aspects and be implemented in a variety of ways. In one example, perhaps the ranking of the servers from the manager lists, in descending order of desirability, servers E, A, D, C, B. The client device notes that the bandwidth and content requirements it has are met by servers A, C and B. The client device then selects server A for the content.

Once the representations/segments are selected, the representations/segments may be requested and received from the selected server as indicated in operation 710 and request/response 712. The content may be turned over to another module, entity, and so forth for playback as indicated by arrow 714.

Operation 716 represents determining whether to send QoE information to the manager. As discussed above, QoE information may be sent according to some prearranged schedule, due to changes in the QoE information since the last update, in response to an inquiry from the manger 604, or upon any other triggering event. If QoE information is to be sent, the "YES" branch is taken and the information is sent in operation 718. If not, then the "NO" branch is taken.

Operation 720 determines whether playback is finished. If so, the "YES" branch is taken and processing continues onto other things. If no, then the "NO" branch is taken and execution resumes at operation 704.

Although the embodiment of FIG. 7 illustrates certain operations as taking place each time through the "loop" including operations 704, 706, 708, 710 and 716, not all operations need to take place each time through the loop. For example, in some embodiments, operation 706 which requests and receives information such as the relative ranking and/or server status may not need to be executed every time through the loop. If the time since the last raking/status update is short, then the ranking/status may not need to be updated. In this context "short" means that the ranking and/or status is not likely to have changed since the last update. In some situations this "short" time may be measured in seconds or minutes. A client device may request a status update when a noticeable quality degradation occurs, or on client specific interval (5-10 sec. for example). Moreover, the DASH manager can broadcast updates when new servers register or degregister, or upon receiving server updates. A DASH manager can send a specific status update to clients with "bad" streaming QoE.

Figure 8:
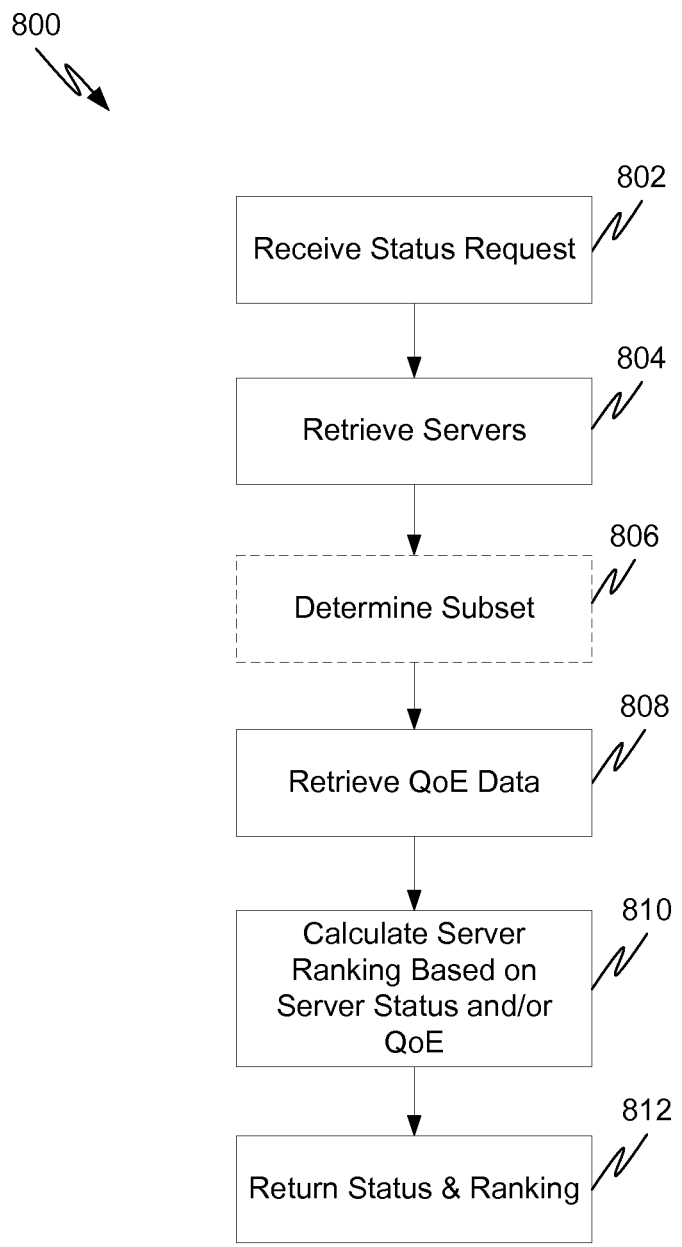
FIG. 8 illustrates an example manager flow diagram.

FIG. 8 illustrates an example manager flow diagram 800. The flow diagram focuses more particularly on responding to a request from a client device for a relative ranking and/or server status. Operation 802 indicates that the manager receives such a request. The next two operations (804, 806) indicate the process the manager goes through to identify the relevant set of servers that it should consider in the ranking. In some instances, all the servers managed by the manager may be considered (e.g., operation 804). In some instances, a subset may be considered (e.g., operation 806). Depending on the number of content servers managed by the manager, it may be desirable to consider and rank only some subset of the servers. This subset may be selected based on various criteria such as those servers that are close (in some sense) to the client device, those servers that have the content that the device is interested in, those servers that meet certain technical requirements such as bandwidth, load, number of client devices being served, combinations thereof, and so forth. The load on the media server may be calculated as the sum of all the upload and/or download rates on the server for all the clients they are servicing in some embodiments. Some embodiments may use the remaining capacity of a media server in place of, or in addition to, the load. Note that some criteria may be determined from QoE information supplied to the manager from the client device (e.g., operation 808).

In operation 808 the manager retrieves the relevant QoE information from the data store or from wherever it is located (including being received from the client device). If the QoE information is needed to select the relevant subset of content servers (operation 806), then this operation may be performed prior to operation 806.

The manager computes the relative ranking based on server status and/or QoE information in operation 810. The ranking may be based on a variety of factors such as which servers have content desired by the client device, the load on a particular media server, the number of devices being served by a particular media server, the desired streaming bandwidth of the client device, the online status of a particular media server, the number of failed connections experienced by a client, the buffering events at particular client (e.g., the number of times a client device had to wait for content to buffer), total buffering time, the average buffer depth at a client, the average bandwidth experienced by a client, and so forth. The load on the media server may be calculated as the sum of all the upload and/or download rates on the server for all the clients they are servicing in some embodiments. Some embodiments may use the remaining capacity of a media server in place of, or in addition to, the load. One set of objectives of the manager may be to give a client the best QoE while maximizing overall resource utilization, such as balancing the load between available servers.

Many different methods may be used by different embodiments of managers to compute a recommendation for making a recommendation to a client device. A recommendation may come in the form of at least one recommended media server. If more than one media server is included in the ranking, then the ranking may be relative, with each server having a ranking relative to the others. In one representative example, if the manager receives a status update from a client device who has suffered from a poor QoE, the manager can then search for the server with the least load and recommend it to the client and/or rank it higher on the recommendation list. Thus, elevating that client's chance of getting a higher QoE in the future.

In another representative example, the manager can follow a "greedy" type method where it attempts to allocate the client devices to servers in such a way that each client device is able to download at its maximum download rate. For example, consider a representative architecture having two media servers, with media server A having an upload limit of 5 Mbps, and media server B having an upload limit 4 Mbits). If there are initially two client devices, with client device C1 having download rate 2 Mbps, and client device C2 having a download rate 3 Mbps, the manager may start each client device streaming off one of the servers. Thus, each client device would be able to stream its maximum bandwidth. Suppose, the manager recommends client device C1 select server A and client device C2 select server B. If a third client device C3 having a download rate of 4 Mbps decides to join, the manager can choose to allocate client device C2 to Server A and allocate client device C3 to Server B, thus each client is guaranteed to download at its maximum download rate. This may be accomplished by the manager recommending that client device C2 select server A and client device C3 select server B. Thus, the manager is able to better utilize the bandwidth available at all the servers. If not for this re-allocation, then client device C3 would share a server with either client device C1 or client device C2 and download at only a fraction of its maximum download rate, while possibly impacting whichever client device shares its server.

Such a method may be accomplished using the following operations:

Operation 1: identify the set of candidate client devices who are currently registered at the manager.

Operation 2: while candidate client devices remain to be allocated, perform the following operations:

Operation 2a: identify the server with the maximum available bandwidth, where the available bandwidth is calculated by: maximum available bandwidth=total upload bandwidth at the server—current load at the server.

Operation 2b: identify the candidate client device having the largest download bandwidth.

Operation 2c: allocate the candidate client device identified in operation 2b to the server identified in operation 2a.

Operation 2d: add the allocated candidate client device download bandwidth to the allocated server load.

Operation 2e: remove the allocated candidate device from the set of candidates that remain to be allocated and return to operation 2a.

As discussed above, the allocation may be in the form of a relative ranking or a suggested selection.

In operation 812 the manager returns the relative ranking and/or any desired media server status information to the client device.

Figure 9:
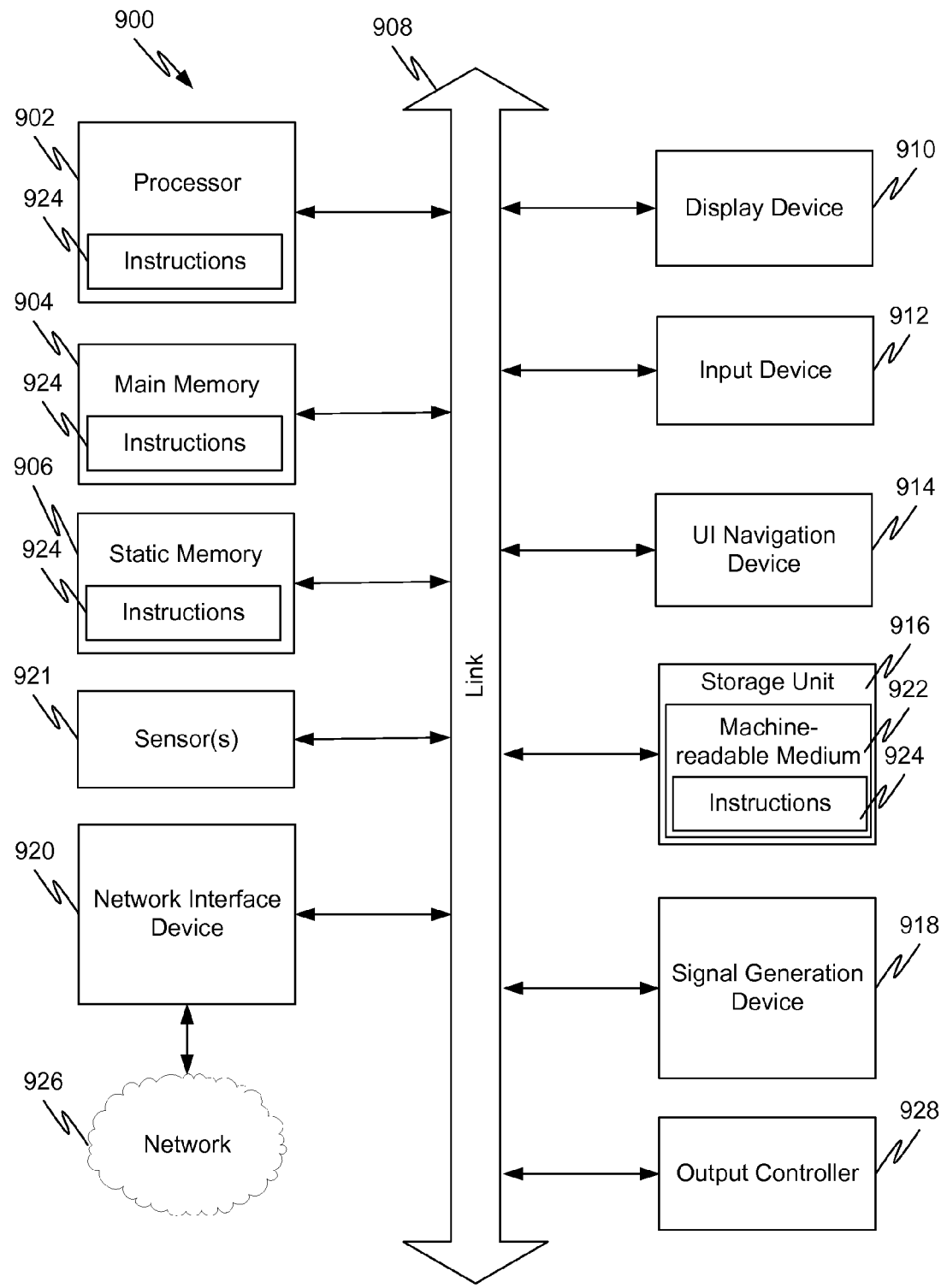
FIG. 9 illustrates a system block diagram for representative manager or client device according to some embodiments.

FIG. 9 illustrates a system block diagram for representative manager or client device according to some embodiments. This example machine 900 may be used for any one or more of the techniques (e.g., methodologies) discussed herein may be performed such as those illustrated in FIGS. 5-8. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a processing unit, a graphics processing unit (GPU), a hardware processor core, advanced processing units (APUs) or any combination thereof), a main memory 904, and a static memory 906, some or all of which may communicate with each other via a link 908 (e.g., a bus, link, interconnect, or the like). The machine 900 may further include a display device 910, an input device 912 (e.g., a keyboard), and a user interface (UI) navigation device 914 (e.g., a mouse). In an example, the display device 910, input device 912, and UI navigation device 914 may be a touch screen display. The machine 900 may additionally include a storage unit (e.g., drive unit) 916, a signal generation device 918 (e.g., a speaker, audio output, etc.), a network interface device 920, and one or more sensors 921, such as a global positioning system (GPS) sensor, camera, video recorder, compass, accelerometer, or other sensor. The machine 900 may include an output controller 928, such as a serial (e.g., universal serial bus (USB), parallel, or other wired or wireless (e.g., infrared (IR)) connection to communicate or control one or more peripheral devices (e.g., a printer, card reader, etc.).

The storage unit 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage unit 916 may constitute machine-readable media.

While the machine-readable medium 922 is illustrated as a single medium, the term "machine readable medium" may include a single medium or multiple media (e.g., a centralized or distributed database, and/or associated caches and servers) that configured to store the one or more instructions 924.

The term "machine-readable medium" may include any tangible medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks. The term "machine-readable storage medium" and the like include the all the aspects of "machine-readable medium" except the term specifically excludes signals per se.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 900, and includes digital or analog communications signals or other intangible medium to facilitate communication of such software.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

For clarity purposes, the above description describes some embodiments with reference to different functional units or processors. However, it will be apparent that any suitable distribution of functionality between different functional units, processors or domains may be used without detracting from embodiments disclosed herein. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present embodiments have been described in connection with some embodiments, it is not intended to be limited to the specific form set forth herein. One skilled in the art would recognize that various features of the described embodiments may be combined in accordance with the disclosure. Moreover, it will be appreciated that various modifications and alterations may be made by those skilled in the art without departing from the scope of the disclosure.

What is claimed is:

1. A DASH manager comprising:
 a processor coupled to memory;
 executable instructions stored in the memory that, when executed by the processor, configure the DASH manager to:
  receive a registration message from each of a plurality of content servers, the DASH manager taking responsibility for management of the plurality of content servers after the registration message is received;
  receive Quality of Experience (QoE) information from a client device;
  receive a media server status update message from at least some of the plurality of content servers, the media server status update message comprising media server status information for the content server sending the status update message;
  receive a media server status update request from the client device;
  evaluate each of the plurality of content servers and identify a set of a plurality of media servers to be included in a media server status update response;
  rank each media server in the set of media servers based on at least one of media server status and the received QoE information;
  sending the media server status update response comprising the ranked set of media servers and at least a portion of the media server status for each of the media servers in the ranked set of media servers.

2. The DASH manager of claim 1, wherein the QoE information comprises at least one of:
 average download rate experienced by the client device;
 number of buffering events experienced by the client device;
 total buffering time at the client device;

average streaming quality experienced by the client device; and failed connection information.

3. The DASH manager of claim 1, wherein the executable instructions further configure the DASH manager to receive a status update from each of the plurality of media servers in order to form the media server status.

4. The DASH manager of claim 1, wherein the at least a portion of the media server status included in the media server status update response comprises at least one of:
    a relative ranking of the at least one media server indicating a suggested relative selection of the at least one media server to the client device;
    online status of the at least one media server;
    content available at the at least one media server;
    number of streaming clients being served by the at least one media server;
    load of the at least one media server;
    location of a Media Presentation Descriptor file;
    available upload rate of the at least one media server.

5. The DASH manager of claim 4, wherein the MPD file comprises a URL of the DASH manager.

6. The DASH manager of claim 3, wherein the status update from each of the plurality of media servers comprises:
    online status of a media server sending the status update;
    content available at the media server sending the status update; and
    load on the media server sending the status update;
    location of a Media Presentation Descriptor file;
    available upload rate of the media server sending the status update.

7. A method executed by a DASH manager comprising:
    receive a registration message from each of a plurality of content servers, the DASH manager taking responsibility for management of the plurality of content servers after the registration message is received;
    receiving Quality of Experience (QoE) information from a client device;
    receive a media server status update message from at least some of the plurality of content servers, the media server status update message comprising media server status information for the content server sending the status update message;
    receiving a media server status update request from the client device;
    evaluate each of the plurality of content servers and identify a set of a plurality of media servers to be included in a media server status update response;
    rank each media server in the set of media servers based on at least one of media server status and the received QoE information; and
    send a media server status update to the client device, the media status update comprising the ranked set of media servers and at least a portion of the media server status for each of the media servers in the ranked set of media servers.

8. The method of claim 7, wherein the QoE information comprises at least one of:
    average download rate experienced by the client device;
    number of buffering events experienced by the client device;
    total buffering time at the client device;
    average streaming quality experienced by the client device; and
    failed connection information.

9. The method of claim 7 further comprising receiving a status update from a plurality of media servers in order to form the media server status.

10. The method of claim 9, wherein the at least one server status comprises at least one of:
    online status of the at least one media server;
    content available at the at least one media server;
    number of streaming clients being served by the at least one media server;
    load of the at least one media server;
    location of a Media Presentation Descriptor file; and
    available upload rate of the at least one media server.

11. The method of claim 10, wherein the relative ranking of the at least one media server is calculated from information in the at least one server status.

12. The method of claim 9, wherein the method further comprises:
    receiving registration information for the least one media server; and
    maintaining an updated media server status store when new status updates are received.

* * * * *